United States Patent
Michaels et al.

[11] 3,901,232
[45] Aug. 26, 1975

[54] INTEGRATED DEVICE FOR ADMINISTERING BENEFICIAL DRUG AT PROGRAMMED RATE

[75] Inventors: Alan S. Michaels, Atherton; John D. Bashwa, Palo Alto; Alejandro Zaffaroni, Atherton, all of Calif.

[73] Assignee: Alza Corporation, Palo Alto, Calif.

[22] Filed: Oct. 26, 1973

[21] Appl. No.: 409,814

[52] U.S. Cl.............. 128/260; 128/272; 128/214 F
[51] Int. Cl............................ A61j 1/00; A61m 31/00
[58] Field of Search.... 128/260, 268, 2, 272, 214 F, 128/1 R; 222/386.5; 424/16, 46, 21, 12, 423

[56] References Cited
UNITED STATES PATENTS

| | | | |
|---|---|---|---|
| 3,545,439 | 12/1970 | Duncan | 128/260 |
| 3,551,556 | 12/1970 | Kliment et al. | 128/268 X |
| 3,598,123 | 8/1971 | Zeffaroni | 128/268 |
| 3,630,200 | 12/1971 | Higuchi | 128/260 |
| 3,641,237 | 2/1972 | Gould et al. | 128/260 X |
| 3,699,963 | 10/1972 | Zaffaroni | 128/268 |
| 3,786,813 | 1/1974 | Michaels | 128/260 |
| 3,788,322 | 1/1974 | Michaels | 128/260 |
| 3,797,492 | 3/1974 | Place | 128/260 |

*Primary Examiner*—Aldrich F. Medbery
*Attorney, Agent, or Firm*—Paul L. Sabatine; Edward L. Mandell

[57] ABSTRACT

A drug delivery device for the controlled and continuous administration of a drug at a dosage unit programmed rate is comprised of a bioerodible hollow container housing a drug delivery device attached to a collapsed balloon. The device is formed of an essentially imperforate drug release rate controlling material containing a drug and permeable to the passage of drug or it is formed of a microporous material having a drug distributed therethrough and whose micropores are a means for containing a drug release rate controlling medium permeable to the passage of drug. The device administers a therapeutically effective amount of drug over a prolonged period of time on its release from the bioerodible container in the environment of use.

11 Claims, 6 Drawing Figures

INTEGRATED DEVICE FOR ADMINISTERING BENEFICIAL DRUG AT PROGRAMMED RATE

BACKGROUND OF THE INVENTION

This invention pertains to both a novel and useful drug delivery device for administering a drug to produce a local or systemic physiological or pharmacological beneficial effect. The invention resulted from a chronic need for a drug delivery device particularly gastrointestinal devices, that is easy to use, confortable to the host, inexpensive and concomitantly can administer a drug at a continuous and controlled rate for a prolonged period of time at a desired drug dosage rate. This need existed in the medical, veterinary and pharmaceutical arts because prior attempts to achieve a prolonged release of a drug generally has led to unacceptable results. For example, many prolonged release preparations orally administered to achieve a prolonged result used assorted drug coatings designed to allow the release of the active drug after a certain time in the gastrointestinal tract lead to problems that gave unacceptable results. One problem is that in some cases soluble drug diffused through the coatings which often were insoluble in gastric fluids and in other cases some of the coatings resisted disintegration so that prolonged release preparations would pass through the gastrointestinal tract intact. Alos, many drug coatings prepared in the past depended on the assumption that the stomach contents were very acid and the intestinal contents were basic to achieve disintegration of these coatings without any real consideration of the physiological variation of pH that can occur for these contents. Therefore, coatings which depended on pH for disintegration were not as efficient as planned and complete drug release was not obtained.

Other prolonged release medication involved the administration of coated particles or pellets, hard capsules and the like to produce a desired concentration of the drug in the blood, but these too have not led to the desired blood levels. For example, if the dose of the drug gives a repeated administration effect, the concentration in the blood rises to peaks and falls to valleys depending on the number, frequency and availability of the doses. The peak-valley effect may not be satisfactory in terms of providing the best therapy, because at the peak, the high concentration may cause side effects, and in the valley, the concentration may be insufficient to elicit suitable response. Thus, these types of prolonged release preparations, as with other alleged prolonged release preparations, often are not suitable for releasing drug at a controlled rate for a prolonged period of time.

SUMMARY OF THE INVENTION

Accordingly, it is an immediate object of this invention to provide a drug delivery device for the administration of a locally acting or systemically acting drug to produce a physiologic or pharmacologic effect which device essentially overcomes the disadvantages associated with the prior art prolonged release forms of administration.

Still another important object of the invention is to provide a gastrointestinal drug delivery device for releasing drug at a controlled and continuous rate for a prolonged period of time while simultaneously eliminating the necessity for taking drug at repeated intervals.

A further object of this invention is to provide a complete dosage regimen for administering a drug for a particular time period, the use of which requires intervention only for the initiation of the regimen and would also eliminate missed doses because of forgetfulness.

Still a further object of the invention is to provide a gastrointestinal drug delivery device suitable for continuously administering a drug in the stomach and remaining therein until the prescribed dosage regimen is essentially completed before the device is eliminated from the gastrointestinal tract.

Yet still a further object of the invention is to provide an orally administrable drug delivery device for use as a single administration and wherein the device is self-contained and will remain in the stomach for an extended time while administering drug from a drug reservoir by diffusion through a drug release rate controlling material.

In attaining the objects, features and advantages of the invention, a novel gastrointestinal drug delivery device is provided for the continuous dispensing of a drug in the gastrointestinal tract which device is self contained, self activated to operate independently of its surroundings, and can automatically exit the gastrointestinal tract after an extended period of drug administration. The drug delivery device is comprised of a physiologically erodible container having an internal space for housing the drug delivery device. The device is comprised of a reservoir for housing a drug and it is formed of either an essentially imperforate drug release rate controlling material permeable to the passage of drug, or the reservoir is formed of a microporous material containing in its micropores a drug release rate controlling medium permeable to the passage of drug. The reservoir is fixed to a deformable, hollow mamber that can inflate on release of the device from its storage and transport container in a physiological environment and then deflate to allow the device to pass from the physiological environment. Also, the device can be fabricated of biodegradable materials that biodegrade after a period of time to permit passage of the device from the environment.

Other objects, features and advantages of the invention will be apparent to those skilled in the art from the following detailed description of the invention, taken in conjunction with the drawings and the accompanying claims.

BRIEF DESCRIPTION OF THE DRAWINGS

In the drawings, which are not drawn to scale, but rather are set forth to illustrate various embodiments of the invention, the drawings are as follows.

In the drawings and the specification, like parts in related figures are identified by like numbers. The terms appearing earlier in the specification and in the description of the drawings, as well as various embodiments thereof, are further described in detail elsewhere in the disclosure.

DETAILED DESCRIPTION OF THE DRAWINGS

Figure 1:
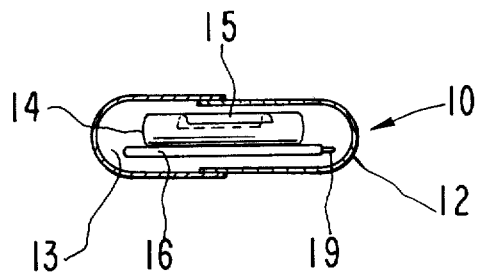
FIG. 1 is a side perspective view of a drug delivery device of the invention housed in a container prior to use.

Turning now to the drawings in detail, which drawings are examples of various drug delivery devices of the invention, and which examples are not to be construed as limiting, one generic example of a novel drug delivery device is generally indicated in FIG. 1 by numeral 10. Drug delivery device 10 is illustrated in side perspective view and it is comprised of a bioerodible container 12 having an internal space 13 housing a drug delivery device 14 of uniform structure having at least one surface 15 of a drug release rate controlling material permeable to the passage of drug (not shown in FIG. 1). Device 14 is suitably fixed to a deformable hollow member 16 that can reversibly expand or collapse on release of device 14 from container 12. In FIG. 1 drug delivery device 14 is depicted in miniature in container 12 to exemplify on operative embodiment of the invention. An enlarged, detailed illustration of FIG. 1 with other embodiments is set forth in the remaining FIGS. 2 through 6.

Figure 2:
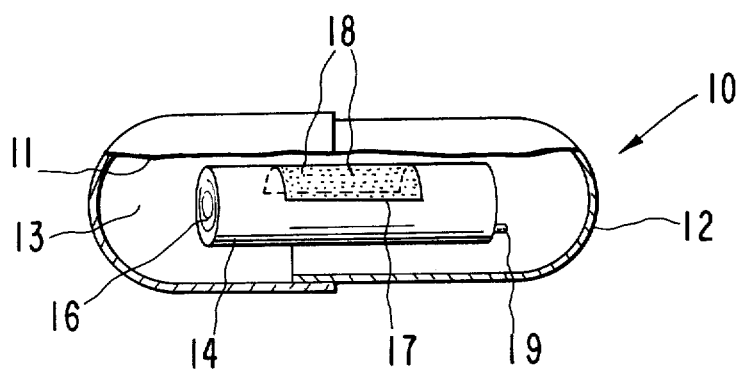
FIG. 2 is an enlarged, side perspective view illustrating a drug delivery device in a closed container with a section of the container removed for showing a device therein.

Referring to FIG. 2, gastrointestinal drug delivery device 10 is illustrated comprised of a bioerodible container 12 with a section 11 of container 12 removed to illustrate an internal space 13 housing device 14. Container 12 is advantageously formed of two parts with one part designed to telescope into the other part for easily housing device 14 in container 12. Container 12 is made of bioerodible materials, such as gelatin, that move quickly and easily through the esophagus to the stomach wherein it quickly bioerodes to free device 14. Containers of other construction and made of other bioerodible materials can also be used for housing the device and for releasing the drug delivery device in the stomach.

Device 14 in the embodiment of the invention illustrated in FIG. 2 is comprised of a reservoir 17 for containing a drug 18 or a mixture of drugs and it consists of a substantially imperforate drug release rate controlling material having drug 18 distributed therethrough and permeable to the passage of drug as by diffusion. Reservoir 17, in one embodiment, is a solid or semisolid membrane suitably fixed by adhesively joining reservoir 17 to a hollow deformable member 16 that acts as an in vitro and in vivo support member for reservoir 17. Reservoir 17 in one embodiment is suitably joined to member 16 with conventional adhesives, such as α-cyanoacrylates, acrylic and methacrylic adhesives, epoxies, plasticized polyvinyl adhesives, and the like. Other known techniques, such as thermal joining, casting the support onto the reservoir and the like can be used to fix reservoir 17 in sealed relationship with member 16. Member 16 is freely movable from a collapsed state to an expanded state on release of device 14 from container 12 and it is returnable to a collapsed position after a period of time. Member 16 contains a gas stored in solid or in liquified form at ambient temperature which as solid or liquid produces at physiologic temperatures a gas that has a vapor pressure in excess of one atmosphere to cause member 16 to inflate to a predetermined size and shape. Member 16 is made of naturally occurring or synthetic flexible polymeric materials that lend themselves to reversible changes in size and shape. Member 16 is equipped with an erodible plug 19 that erodes in the environment of use after a predetermined time to release the gas from member 16 to deflate it to a collapsed state for passage through the lower gastrointestinal tract. In another embodiment member 16 is made from a material that is permeable to a gas to let the gas slowly diffuse therefrom causing it to deflate for eventual passage through the gastrointestinal tract. In FIG. 2, member 16 is optionally illustrated as a completely sealed tube, but it is to be understood that other embodiments such as envelope, flat bag, balloon and the like are within the mode and manner of the invention.

Figure 3:
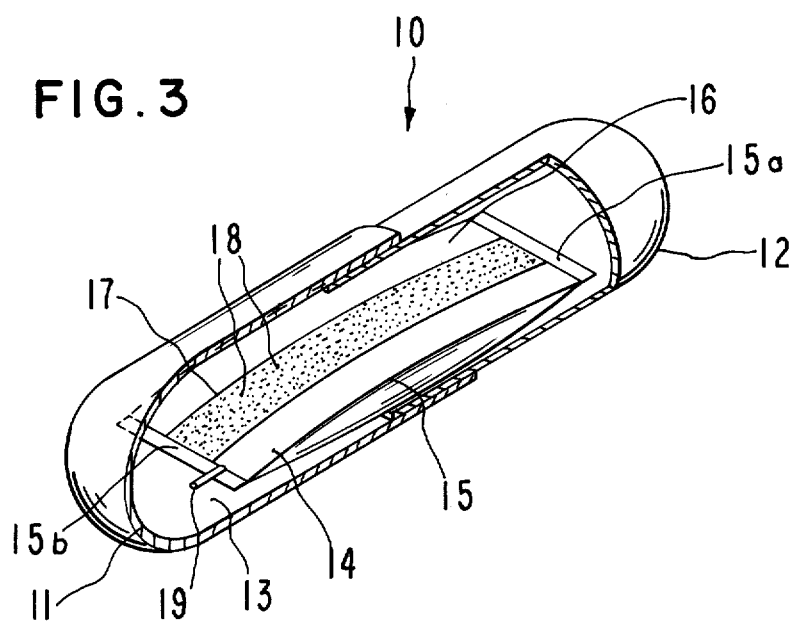
FIG. 3 is a magnified isometric view illustrating another device of the invention confined in a container with a central section removed for showing details of the device.

In FIG. 3 another drug delivery device 10 is illustrated comprised, in combination, of a swallowable bioerodible container 12 made of two telescopically associated non-toxic envelopes with a section 11 of container 12 removed to show an internal space 13 carrying a drug delivery device 14. Container 12 has a size and shape adapted for oral administration, that is, swallowing and passing by normal peristalsis to the stomachs of humans, farm animals such as cows, horses and the like, household pets such as dogs, and sport animals such as horses. On reaching the stomach, container 12 which is made from gelatin, gelatin derivatives, poly(vinylalcohol) or the like, quickly and easily disintegrates to release device 14 for discharging a medicament into the stomach.

Device 14 is comprised of a reservoir 17 for containing a drug 18 or a mixture of drugs. Reservoir 17 is comprised of a microporous material containing drug 18 distributed therethrough and in its micropores it can also contain a drug or a medium permeable to the passage of drug as by diffusion. Optionally, the medium in the micropores can be gastric fluids which can also serve as a drug release rate controlling medium. Other examples will be presented later in the disclosure. Reservoir 17 is suitably joined to deformable member 16 that is made of naturally occurring or synthetic flexible polymeric materials that can readily change size and shape from collapsed to inflated and back to collapsed. Reservoir 17 covers at least a portion of the outer surface of member 16, or it can cover all the surface of member 16 by adhesive sealing, integral fabrication, heat sealing, mutli-layered coating, or other conventional manufacturing means. Deformable member 16 is illustrated in a collapsed position and it is formed of a section of polymeric film material folded in tubular shape and heat sealed together along its longitudinal seams 15. Member 16 contacting opposed surfaces are sealed together along a transverse bottom seam 15a and a transverse top seam 15b to form a completely sealed deformable member. Member 16 can be formed of one or more layers with one or more surfaces of similar or dissimilar films, and it is manufactured with a bioerodible plug 19 that erodes after a period of time to vent the interior of member 16 to its exterior. Member 16 can optionally be formed of a bioerodible material that erodes after a period of time, or it can be formed of a material permeable to a gas that slowly diffuses therethrough to cause an inflated member 16 to collapse. Member 16 contains a gas stored in solid or liquified form at ambient conditions that produces a gas having a vapor pressure in excess of one atmosphere at the temperature of use, that is, in the stomach, to cause member 16 to inflate to a predetermined size and shape. The dimensions of member 16 in the inflated state will of course vary for different animals but it should be large enough to retain the device in the stomach, that is, slightly larger than the diameter of the pyloric canal which is about 1 cm to 4 cm, usually 2 cm in humans. Hence, in operation, container 12 is administered through the gastrointestinal tract into the stomach where device 14 is freed from the container 12. Member 16 then inflates to place the drug release rate controlling materials 17 in position in the stomach to diffuse drug 18 from reservoir 17 at a constant rate throughout the drug administration period. At the end of this period, plug 19 erodes and device 14 then passes through the lower alimentary tract and out of the body.

Figure 4:
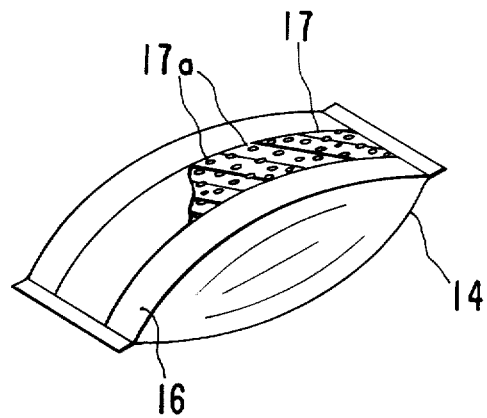
FIG. 4 is the device of FIG. 3 with a section of the drug delivery means exposed to illustrate the device in operative condition.

FIG. 4 graphically depicts the drug delivery device of FIG. 3 freed from its container in a drug operative embodiment. In FIG. 4 device 14 is comprised of an inflated tubular member 16 bearing on one of its surfaces a reservoir 17 which has an open cross section illustrating micropores 17a in the reservoir material. Reservoir 17 is comprised of a microporous material containing a drug that can diffuse from the materials through micropores 17a at a controlled and continuous rate for a prolonged time to produce a beneficial effect. The size of reservoir 17 will vary to correspond to the size of the host, and it will usually be about 1 mil to 15 mm thick and about 1 mil to 50 mm long, or larger. The reservoir is made and joined to the supporting structure by conventional techniques, such as casting, lamination, interface sealing, adhesive joining and the like to yield a composite device. Standard manufacture techniques for making the device are well known to the art as described in *Modern Plastic Encyclopedia*, Vol. 46, No. 10A, 1969, and in *ASTM Standards*, Structural Sandwich Constructions, Part 16, T. Peel Test: ASTM 1876-61 T. Peel Resistance, 1965, published by the American Society for Testing and Materials, and like references.

Figure 5:
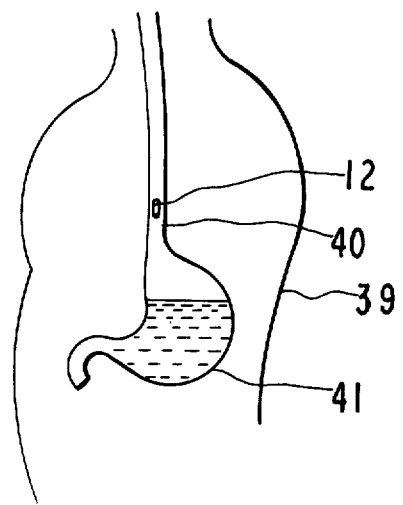
FIG. 5 is a side view diagrammatically illustrating a container housing a drug delivery device descending in the esophagus.
Figure 6:
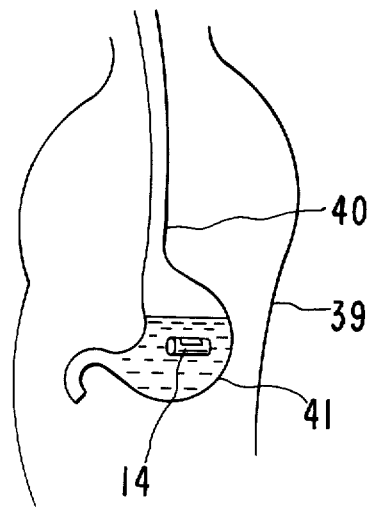
FIG. 6 is a side view diagrammatically depicting a drug delivery device in use in the stomach.

FIG. 5 and FIG. 6 diagrammatically illustrate the use of the gastrointestinal drug delivery device of the invention. In FIG. 5 there is seen an outline of a human 39 with a container 12 moving through an esophagus 40 toward a stomach 41. In FIG. 6 drug delivery device 14 is seen administering a drug in stomach 41 to produce a prolonged beneficial result.

DETAILS OF THE INVENTION

Drug delivery device 14 of this invention can be made into different sizes and shapes with these dimensions adapted for administration to a particular animal and to the ease of manufacture. The shape of the device is usually tubular but other shapes such as oblong, oblate, prolate, spherical, halfcircle, and the like can be used according to the spirit of the invention. The device is fabricated for oral administration into the stomach and the size of the deformable hollow member 16 of the device in the inflated state will be slightly larger than the diameter of the pyloric canal of different animals is available in standard medical books, and for humans the size of the inflated member will be about 1 cm in diameter to about 10 cm in length, usually about 2 cm by 4 cm. Other sizes such as 2 cm by 5 cm, 3.14 cm by 5 cm, 4 cm by 4 cm and the like are also within the mode and manner of the invention.

Deformable member 16 bearing reservoir 17 is suitably made from naturally occurring or synthetic materials and it is made of film about 0.2 mils to 100 mils thick, or more; usually 0.4 mils to 20 mils thick, and the like. The walls of member 16 can be made of a single material, a combination of materials in laminated form, elastomeric materials bonded on thin foils, and the like. Illustrative materials suitable for this purpose include silicone, poly(urethanes), poly(acrylonitriles), poly-(ethylene), poly(propylene), poly(vinylidene chloride), poly(vinylidene fluoride), acrylic elastomers, ethylene propylene terpolymers, laminates such as poly(ethylene)-poly-(vinylidene chloride), nylon-poly(vinylidene chloride), poly-(ethylene)-poly(vinylidene chloride)-poly(ethylene), poly-(ethylene)-poly(vinylalcohol)-poly(vinylidene)chloride, metal foils such as tin foils, aluminum foils, plastic coated foils such as poly(ethylene) coated on tin foil, poly(vinylidenechloride) on think tin, nylon-poly(vinylidene chloride) acrylic elastomers laminated with foils, and the like.

Exemplary materials for use forming bioerodible plug 19 and also useful for forming deformable membrane 16 when it is optionally made from bioerodible materials, include those materials that bioerode in the environment of use, that is, in the stomach, at a predetermined given time, or over a period of time. These materials are those that bioerode by known physiological processes, such as chemical degradation, acidic hydrolysis, enzymatic action, oxidation, reduction, dissolution, slow solubilization and the like biological processes. The bioerosion rate for suitable materials can be easily determined by standard assay procedures that consist of placing a section of bioerodible material in natural or artificial gastric juice at normal body temperature and then observing the rate of erosion over a known period of time. By a prolonged period of time for the purpose of this invention is meant from 3 hours to 30 days, usually 1 day to 8 days.

Representative bioerodible materials for making the above generally include hydrophilic polymers, uncrosslinked hydroxyalkyl acrylates and methacrylates, hydrolytically biodegradable poly(anhydride) polymers as described in U.S. Pat. Nos. 2,073,799; 2,668,162; and 2,676,945; and in *Introduction to Polymer Chemistry*, Stille, J. K. Chapter 6, 1962 as published by Wiley Publishing Co., bioerodible polyesters as described in *Industrial and Engineering Chemistry*, Vol. 36, No. 3, pages 223 to 228, 1964; *Macrmol Chem.*, Vol. 75, pages 211 to 214, 1964; U.S. Pat. Nos. 2,703,316; 2,668,162; 3,297,033; and 2,676,945; cross-linked gelatin prepared with a cross-linking agent reactive with the hydroxyl, carboxyl or amino functional groups of the gelatin molecule as described in *J. Polymer Science*, Part A-1, Vol. 5, No. 1, 1967; *J. Polymer Science*, Vol. 54, pages 321 to 335, 1961; *Advances in Protein Chemistry*, Vol. 41, entitled Cross Linkage in Protein Chemistry, 1961, published by Academic Press, Inc.

Other materials that can be used to form bioerodible films and plugs include proteins and hydrocollids of animal and plant origin such as modified collagen, elastin, keratin, fibrin, algin, karaya, pectin, carrageenin, chitin, heparin, locust bean gum, and the like. Also, commercially available synthetic polymers such as poly- (ethylene oxide), poly(vinylpyrrolidone), poly(ethyleneimine), poly(acrylic acid) copolymers of acrylamide and methacrylamide up to 40% by weight of N-methylene bisacrylamide or N,N-dimethyl urea, water soluble polyurethanes, and the like.

Exemplary materials suitable for inflating deformable member 16 are inorganic and organic compounds that are essentially solid or liquid at ambient temperature, usually at 20° to 35°C, while at physiological temperatures, for example 35° to 40°C, they freely change to a gas whose vapor phase is in equilibrium with its solid or liquid phase to exert a vapor pressure in excess of one atmosphere. Typical compounds are those compounds with a boiling point, BP, as follows: halogenated hydrocarbons, fluorochlorinated lower saturated aliphatic hydrocarbons, halogenated lower alkanes of 1 to 4 carbon atoms and the like, such as, diethyl ether BP 34.6°C, methyl formate BP 31.5°C, tetramethyl silane BP 26.5°C, iso-pentane 27.9°C, perfluoropentane isomers BP 31.0°C, n-pentane 36°C, diethenyl ether 28°C and the like. Usually the amount of gas stored in the liquified phase in deformable member 16 will be about 0 1 cc to 10.00 cc, or higher, usually about 0.2 cc to 0.5 cc, and the volume of the vapor phase will be from 1 percent to 50 percent of the inflated member.

Representative of drug release rate controlling materials useful for forming the reservoir of the device and having a drug distributed therethrough are materials that are permeable to the drug to permit passage of the drug by diffusion through the material that is essentially imperforate or homogenous at predetermined rates. In this process, the drug dissolves and equilibrates in the material, and then diffuses in the direction of lower chemical potential, that is, toward the reservoir's surface. The rate of passage of the drug through the material is described by Fick's Law of Diffusion and it is generally dependent, in the case of diffusion, on the solubility of the agent therein, as well as on the thickness of the material. This means that selection of appropriate materials for fabricating the reservoir will be dependent on the particular drug to be used. By varying the composition and thickness of the reservoir, the dosage rates per area of the gastrointestinal device can be controlled for this material acts to meter the diffusion of the drug from the reservoir.

In a gastrointestinal drug delivery device of the invention having a reservoir formed from a microporous material that contains drug distributed therethrough and in its micropores, drug is released from the device by diffusion through the micropores that can also contain in the micropores a medium that is permeable to the drug at a controlled and predetermined rate. That is, in this material, the rate of passage or the rate of drug release from the reservoir is governed by diffusion of the drug through the micropores, or the microholes of the material forming the reservoir. When a medium is present in the micropores it can consist, in one embodiment, of a liquid phase comprised of a solution, a colloidal solution, a suspension, or a sol, and the solution can be polar, semi-polar or non-polar; or it can be gastric fluid absorbed by the reservoir from the stomach. In these media, the active drug can have different degrees of solubility, such as fully soluble, partially soluble and the like, to act in cooperation with the reservoir material for achieving a controlled release rate.

The materials suitable for fabricating the reservoir of the drug device are generally those materials capable of forming walls, with or without micropores, through which the drug can pass at a controlled rate of release by diffusion. Such materials are referred to in this specification and the appended claims as "release rate controlling materials". Suitable materials for forming the wall are naturally occurring or synthetic materials, preferably materials that are biologically compatible with body fluids, and gastrointestinal tract tissues, and, capable of medical use for prolonged periods of time.

Exemplary naturally occurring or synthetic materials suitable for fabricating the reservoir are release rate controlling materials such as poly(methylmethacrylate), poly(butylmethacrylate), plasticized poly(vinylchloride), plasticized nylon, plasticized soft nylon, plasticized poly(ethylene terephthalate), natural rubber, poly(isoprene), poly(isobutylene), poly(butadiene), poly(ethylene), poly(tetrafluoroethylene), poly(vinylidene chloride), poly(acrylonitrile), cross-linked poly(vinylpyrrolidone), poly(trifluorochloroethylene), chlorinated poly(ethylene), poly(4,4'-isopropylidene diphenylene carbonate), and the like. Also, by way of non-limiting example, copolymers such as butylene-vinylacetate, plasticized ethylene-vinylacetate, vinylidene chloride acrylonitrile, vinyl chloride diethyl fumarate and the like. Examples of other materials include silicone rubbers, especially the medical grade poly(dimethylsiloxanes), ethylene propylene rubber, and silicone-carbonate copolymers, copolymers of styrene and butadiene, modified insoluble collagen, cross-linked insoluble poly(vinylalcohol), cross-linked partially hydrolyzed insoluble poly(vinylacetate), and surface treated silicone rubbers as described in U.S. Pat. No. 3,350,216. Other polymeric membranes that are biologically compatible and do not adversely affect the drugs can be used.

Additionally, other materials permeable to the passage of gastrointestinal deliverable drugs that are suitable for the present purpose include copolymers such as acrylonitrile dithioglycidol, acrylonitrile ethylene oxide, poly(vinyl butyral) comprised of 11% to 45% free hydroxyls, anisotropic permeable microporous membranes of ionically associated polyelectrolytes, the microporous polymers formed by the coprecipitation of a polycation and a polyanion as described in U.S. Pat. Nos. 3,276,589; 3,541,005; 3,541,006; 3,546,142; and the like; treated aliphatic polyamide membranes as in U.S. Pat. Nos. 2,071,253; 2,966,700; 2,999,286; and the like; vinylidene chloride vinyl chloride copolymer 40/60 and 10/90; ethylene vinylacetate acrylate; vinyl chloride acrylonitrile copolymer 80/20, 75/25, 50/50 and the like; vinylidene chloride acrylonitrile copolymer 60/40 and 12/88; water insoluble natural gums, natural gums, and the like. Also, microporous materials such as cellulose diacetate, cellulose triacetate, poly(urethanes), poly(arylenes), poly(carbonates) and the like. For example, the wall can comprise insoluble, nonerodible cellulose, acylated cellulose, esterified cellulose, cellulose acetate propionate, cellulose acetate butyrate, cellulose acetate phthalate, cellulose acetate diethylaminoacetate, poly(electrolytes) with a pore size of 7 to 50A, epoxy resins, poly(olefins), poly(vinylchlorides) with a pore size of about 50A or less to 150 microns or larger as conventionally made by leaching out incorporated salts, soap micelles, starch or the like materials to give a microporous membrane. Also, the materials that can be used include those materials having homogenous properties and microporous properties, such as cross-linked gelatinous membranes; and the like. The rate controlling structures formed from the materials can be isotropic, wherein the structure is homogenous throughout the cross-section of the wall, or it can be anisotropic wherein the structure is non-homogenous. The rate controlling structures are commercially available and they can also be made by different art known methods, for example, etched nuclear track, leaching, polyelectrolytic processes, ion exchange polymer reactions, and by other techniques as described in *Synthetic Polymer Membranes*, by R. E. Kesting, Chapters 4 and 5, 1971, published by McGraw Hill, Inc., and in *Ultrafiltration, Chemical Reviews, Vol.* 18, pages 373 to 455, 1934. Generally, materials possessing from 5% to 95% pores and having an effective pore size of from about 10 angstroms to about 100 microns can be suitably employed as microporous walls in the practice of this invention.

The rate of release of a drug, that is, the permeability, through various diffusive medium in the micropores of the reservoir wall can be easily determined by those skilled in the art by standard procedures, as described in *Encyl. Polymer Science and Technology, Vols.* 5 and 9, pages 65 to 82 and 794 to 807, 1968, and the references cited therein; in *Membrane Science and Technology*, by Flinn, James E., pages 16 to 32, and 120 to 138, 1970, published by Plenum Press Inc.; *Chemical Engineers Handbook*, pages 17–42 to 17–45, 1963, pbulished by McGraw Hill, Inc. One applicable method employs Fick's Law of Diffusion, wherein the flux of drug through a convection-free medium, for example, a liquid present in a porous membrane is given by the equation:

$$J = \frac{\epsilon D}{\tau} \frac{dc}{dx}$$

wherein
"$J$" is the flux in gm/cm$^2$sec.,
"$\epsilon$" is the porosity in cm$^3$cm$^3$,
"$\tau$" is the tortuosity factor,
"$D$" is the diffusion coefficient cm$^2$/sec,
"$dc/dx$" is the drug concentration gradient across the barrier.

Thus, when the diffusion coefficient is assumed to be independent of concentration, and the concentration at the outside surface is negligibly small, the equation can be expressed as follows:

$$J = \frac{\epsilon D}{\tau} \frac{C_s}{l}$$

wherein
"$C_s$" is the saturation solubility of the drug in the diffusive medium; and,
"$l$" is the barrier thickness.

The diffusion coefficient "$D$" will be in the order of $2 \times 10^{-6}$ cm$^2$sec$^{-1}$ when the drug has a small molecular diameter, for example, about 10A and the pore diameter of the microporous wall is large in comparison with the molecular drug diameter, for example, at least greater by a factor of 10. However, when the pore diameter of the rate controlling membrane is reduced relative to that of the molecular drug diameter, to for example, from 10 to about 3 times the molecular diameter, the diffusion coefficient "$D$" will decrease to values as low as $2 \times 10^{-8}$ cm$^2$sec$^{-1}$. When the ratio of membrane pore diameter to molecular drug diameter significantly is below about 3, the membranes are considered to be homogeneous diffusion materials. Thus, by varying pore diameter or porosity of the microporous materials, substantial changes in drug release rate can be brought about while still using the same materials.

The rate of release of a drug through various homogenous reservoir materials can easily be determined by those skilled in the art by standard procedures. In this manner, particular imperforate materials used as the reservoir for the drug release rate controlling barrier for release of drug from the reservoirs can be selected. Various techniques, such as the transmission method, the sorption desorption method, and the like, can be used to measure the permeability. One technique that has been found to be eminently well suited is to cast or hot press a film of the material to a thickness in the range of 2 to 60 mils. The film is used as a barrier between a rapidly stirred (e.g., 150 r.p.m.) saturated solution of the drug and a rapidly stirred solvent bath, both maintained at constant temperature (typically 37°C). Samples are periodically withdrawn from the solvent bath and analyzed for drug concentration. By plotting the drug's concentration in the solvent bath versus time, the permeability constant P of the material is determined by the Fick's First Law of Diffusion.

$$\text{Slope of plot} = \frac{Q_1 - Q_2}{t_1 - t_2} = P \frac{AC}{h}$$

wherein
$Q_1$ = cumulative amount of drug in solvent in micrograms at $t_1$
$Q_2$ = cumulative amount of drug in solvent in micrograms at $t_2$
$t_1$ = elapsed time to first sample, i.e., $Q_1$
$t_2$ = elapsed time to second sample, i.e., $Q_2$
$A$ = area of membrane in cm$^2$
$C$ = initial concentration of drug
$h$ = thickness of membrane in cm.

By determining the sloipe of the plot, i.e., $Q_1 - Q_2/t_1 - t_2$, and solving the equation using the known or measured values of A, C, and h, the permeability P constant in cm$^2$/time of the material for a given drug is readily determined. The rate of drug release through different drug release rate controlling wall materials can be easily determined by those skilled in the art by standard procedures, as described in *Encyl. Polymer Science and Technology, Vols.* 5 and 9, pages 65 to 82 and 794 to 806, 1968, and the references cited therein; in *J. Pharm. Sci., Vol.* 52, pages 1145 to 1149, 1963; *ibid., Vol.* 53, pages 798 to 802, 1964; *ibid., Vol.* 54, pages 1459 to 1464, 1956; *ibid., Vol.* 55, pages 840 to 843 and 1224 to 1239, 1966, the references cited therein, and the like.

The solubility of a drug in a diffusive medium used in the micropores can be determined by various art known techniques. One method consists in preparing a solution of the given drug and ascertaining by analysis the amount of drug present in a definite quantity of the medium. A simple apparatus for this purpose consists of a test tube of medium size fastened upright in a water bath maintained at constant temperature. The medium and drug are placed in the tube and stirred by means of a motor driven rotating glass spiral. After a given period of stirring, a definite weight of the medium is analyzed and the stirring continued for an additional period of time. If the analysis shows no increase of dissolved substance after the second period of stirring, the results are taken as the degree of solubility of the drug in the medium. Numerous other methods are available for the determination of the degree of solubility of a drug in a liquid medium. Typical methods used for the measurement of solubility are chemical analysis, measurement of density, refractive index, electrical conductivity, and the like. Details of various methods for determining solubilities are described in *United States Public Health Service Bulletin No. 67* of the Hygienic Laboratory; *Encyclopedia of Science and Technology*, Vol. 12, pages 542 to 556, 1971, McGraw Hill, Inc.; *Encyclopaedic Dictionary of Physics*, Vol. 6, pages 545 to 557, 1962, Pergamon Press, Inc.; and the like.

The diffusion coefficient of a drug is broadly determined by measuring the rate of drug transfers from one chamber through a sintered glass filter of known pore size and thickness into another chamber and calculating from the obtained data the drug transfer rate. The method when used for a diffusive medium is carried out by adding to a first conical flask equipped with a ground glass stopper and a stirring bar, a measured amount of medium and simultaneously, the drug in the same medium is added to a second conical flask while keeping the level of the medium in the two flasks the same. Next, the flasks are stirred, the samples drawn at various time intervals for analysis. The measured rate of drug transport through the sintered glass filter, and the concentration difference of the drug in the two flasks is then calculated. These procedures are known to the art in *Proc. Roy. Sci. London, Ser. A*. Vol. 148, page 1935; *J. Pharm. Sci.*, Vol. 55, pages 1224 to 1229, 1966 and references cited therein. The diffusion coefficient of a drug in the solid carrier can also be experimentally determined by using the above apparatus or similar apparatus and procedures as described in *Diffusion in Solids, Liquids and Gasses*, by Jost, W., Chapter XI, pages 436 to 488, 1960, Revised Edition, Academic Press, Inc., New York.

The solubility of the agent in the release rate controlling material comprising the homogeneous wall of the gastrointestinal device broadly is determined by preparing a saturated solution of a given agent and ascertaining, by analysis, the amount present in a definite area of the material. For example, the solubility of the agent in the homogeneous wall is determined by first equilibrating the wall material with a measured saturated solution of the agent at a known temperature and pressure, for example 37°C and one atmosphere. Next, agent is desorbed from the saturated homogeneous wall material with a suitable solvent for the agent. The resultant solution for the agent then is analyzed by standard techniques such as ultraviolet, visible spectrophotometry, refractive index, polarography, electrical conductivity and the like, and calculating from the data the concentration, or solubility of the agent in the material.

The active drugs that can be administered with the gastrointestinal delivery device of the invention, is administered in accordance with their known use and dose, and combinations of these drugs can also be administered, as described in the *Pharmacological Basis of Therapeutics*, 14th Edition, Goodman, L. S., and Gilman, A., 1970, The Macmillan Co.; *Physicians' Desk Reference*, 25th Edition, 1971, Medical Economics, Inc.; and, Remington's Pharmaceutical Sciences, 14th Edition, 1970, Mack Publishing Co., include without limitation, for example, drugs acting on the central nervous system such as hypnotics and sedatives such as pentobarbital sodium, phenobarbital, secobarbital, thiopental, etc.; heterocyclic hypnotics such as dioxopiperidines, and glutarimides; hypnotics and sedatives such as amides and ureas exemplified by diethylisovaleramide and α-bromoisovaleryl urea and the like; hypnotics and sedative alcohols such as carbomal, naphthoxyethanol, methylparaphenol and the like; and hypnotic and sedative urethans, disulfanes and the like; psychic energizers such as isocarboxazid, nialamide, phenelzine, imipramine, tranylcypromine, pargylene and the like; tranquilizers such as chloropromazine, promazine, fluphenazine reserpine, deserpidine, meprobamate, benzodiazepines such as chlordiazepoxide, and the like; anticonvulsants such as primidone, diphenylhydantoin, ethotoin, pheneturide, ethosuximide and the like; muscle relaxants and anti-parkinson agents such as mephenesin, methocarbomal, trihexylphenidyl, biperiden, levo-dopa, also known as L-dopa and L-β-3-4-dihydroxyphenylalanine, and the like; analgesics such as morphine, codeine, meperidine, nalorphine and the like; antipyretics and anti-inflammatory agents such as aspirin, salicylamide, sodium salicylkamide and the like; local anesthetics such as procaine, lidocaine, naepaine, piperocaine, tetracaine, dibucaine and the like; antispasmodics and antiulcer agents such as atropine, scopolamine, methscopolamine, oxyphenonium, papaverine, prostaglandins such as $PGE_1$, $PGE_2$, $PGF_{1\alpha}$, $PGF_{2\alpha}$, PGA and the like; anti-microbials such as penicillin, tetracycline, oxytetracycline, chlorotetracycline, chloramphenicol, sulfonamides and the like; anti-malarials such as 4-aminoquinolines, 8-aminoquinolines and pyrimethamine; hormonal agents such as prednisolone, cortisone, cortisol and triamcinolone; androgenic steroids, for example, methyltestosterone, fluoximesterone and the like; estrogenic contraceptive steroids, for example, 17β-estradiol and ethinyl estradiol; progestational steroids, for example, 17α-hydroxyprogesterone acetate, 19-norprogesterone, nor-ethindrone and the like; sympathomimetic drugs such as epinephrine, amphetamine, ephedrine, norepinephrine and the like; cardiovascular drugs, for example, procainamide, amyl nitrate, nitroglycerin, dipyridamole, sodium nitrate, mannitol nitrate and the like; diuretics, for example, chlorothiazide, flumethiazide and the like; antiparasitic agents such as bephenium hydroxynaphthoate and dichloropehn, dapsone and the like; neoplastic agents such as mechlorethamine, uracil mustard, 5-fluorouracil, 6-thioguanine, procarbazine and the like; hypoglycemic drugs such as sulfonylureas such as tolbutamide, acetohexamide, tolazamide and chlorpropamide, the biguanides and the like; nutritional agents such as vitamins, essential amino acids, essential fats and the like; and other physiologically or pharmacologically active agents. Also, the drugs can be present as the pharmacologically acceptable derivatives, such as ethers, salts, molecular complexes, esters, amides, acetals, etc. that lend themselves to passage into the circulatory system. These derivatives can be prepared by art known techniques and then used in the practice of the invention. Of course, the drug derivative should be such as to convert to the active drug within the body through the action of body enzymes assisted transformation, pH, specific organ activities, and the like.

The amount of active drug incorporated in the reservoir varies depending on the particular drug, the desired effect, and the time span over which it is desired to have the drug released. Since devices of different sizes and shapes are intended to provide complete dosage regimen, there is no critical upper limit on the amount of drug incorporated in the device. The lower limit will depend on the activity of the drug and the time span of its release from the device. In general, therefore, the amount of the drug incorporated in the device is non-limited and it is an amount equal to, or larger than, the amount of drug that on release from the device that is effective for bringing about the drug's physiological or pharmacological local or systemic effects. For example, the amount of drug present in the delivery device when the device is used for adult humans for a period of time of 4 to 6 days to achieve local or systemic effect is for various drugs, such as propantheline 120 to 300 mg in the device; for glutamic acid hydrochloride an amount in the device of 2400 to 3000 mg; for pargyline hydrochloride 50 to 100 mg; for erythrityl tetranitrate 50 to 100 mg; mannitol hexanitrate 75 to 100 mg; ephedrine sulfate 400 to 600 mg; nylidrin hydrochloride 12 to 48 mg; bethanechol chloride 120 to 480 mg; phentolamine 100 to 400 mg; guanethidine 100 to 1000 mg; atropine 100 mcg to 1250 mcg; and the like.

Drug delivery reservoirs used according to the invention can be prepared by standard manufacturing procedures. For example, a drug in solid, liquid, sol, emulsion or like form is first mixed with a polymeric forming material that can be a monomer, a polymerizable copolymer or a prepolymer in a solid, semi-solid, liquid or like form. The drug is distributed therethrough by ball-milling, calendering, stirring, or like procedure. Next, the mixture is shaped into a preselected shape by molding, casting, pressing, extruding, drawing or the like, and depending on the polymeric material used, cured to yield a drug reservoir. Finally, the reservoir is coated, laminated or the like onto a deformable hollow member. Alternative procedures for preparing the reservoir containing a drug such as solution saturating a polymer with a drug by immersion, polymerizing monomers in the presence of drug, can also be used. Other standard manufacturing procedures are described in *Modern Plastic Encyclopedia*, Vol. 46, pages 62 to 70, 1969, and those well known to those skilled in the art can be used herein.

A typical example will serve to illustrate the invention without being limiting thereof. To 25 parts by weight of progesterone is added 70 parts by weight of polydimethylsiloxane and 5 parts by weight of silicone oil and the mixture stirred to a uniform consistency. Next, 0.25 parts by weight of stannous octoate catalyst is added and the mixture cast into a rectangular mold 6 mm × 6 mm × 60 mm, and the polymer allowed to cure for 30 minutes at ambient conditions to yield a drug reservoir. After curing, the reservoir is cut into a section about 6 mm × 6 mm × 20 mm and sealingly joined with standard epoxy adhesives to a collapsed, closed tubular balloon containing 0.5 ml of diethyl ether to yield a drug delivery device. The device is placed in a gelatin capsule, and it will release about 4.3 micrograms of progesterone per day.

Another example representative of the spirit of the invention is as follows: An elipsoidal collapsable balloon with minor and major axis of 3 cm and 5 cm is fabricated from a copolymer of poly(vinylidene chloride) and poly(vinyl chloride) by conventional vacuum forming and heat sealing processes. Before the final heat seal is made, 0.5 cm$^3$ of diethyl ether is metered into the balloon. Passing through the heat seal is a slowly water soluble filament 0.3 cm in length with a diameter of 0.03 cm which consists of a slowly water soluble copolymer of poly(vinyl alcohol) and poly(ethylene). The ratio of vinyl alcohol units to ethylene units is 6:1.

Affixed to the exterior of the expandable collapsable balloon is a poly(ethylene) film 0.03 cm thick with an area of 10 cm$^2$, with the film covering only a portion of the balloon. The film is secured at its edges to the balloon to provide a hollow space between the film and the balloon. The space between the polyethylene film and the collapsable balloon contains 1 mg of norgestrel, a contraceptive agent, suspended in 0.2 cm$^3$ of sesame oil.

At room temperature the assembly previously described can be housed within a No. 000 gelatin capsule. However, upon ingestion of the capsule and its subsequent rapid dissolution in the stomach, the collapsable balloon rapidly expands to the dimensions previously given because the ether vaporizes at physiologic temperatures. This keeps the total delivery system in the stomach during the drug delivery period. Drug is delivered by diffusion through the polyethylene film at a contraceptive dose of 0.05 mg/day of the active agent, norgestrel.

Throughout the lifetime of the system, the filament of poly(vinyl alcohol) poly(ethylene) copolymer as previously described has been uniformly dissolving in the gastric fluids. A programmed, total dissolution will occur after 20 to 22 days. This results in complete collapse of the balloon and subsequent elimination from the gastrointestinal tract. The system just described represents a "once a month" application of oral contraception.

Among the advantages of the device of the invention are the ease of construction by standard manufacturing techniques devices into units of different sizes, especially of a miniaturized size, also of shapes and forms that are suitable for delivering drug internally to an animal or human. Another important advantage of the claimed delivery device is its ability of dispense at a controlled rate, a beneficial agent having a wide variety of chemical and physical properties and over a wide range of release rates. Also, the device can be adapted for other body openings and passages, such as the bladder, vagina and the like. Still another important advantages of the invention resides in the device's ability to effectively control the rate of release of the drug from the device throughout the major portion of drug administration in a substantial zero order release rate. A further advantage of the device resides in the use of low cost substantially vapor and fluid impermeable materils for the power communicating element resulting in a unit suitable for disposal, after comparatively short periods of use, for example, a day or week, without any external energy source. Additionally, the device can be used to release active agents in rivers, streams and other environments of use. And, although the invention has been described in detail, it will be understood that certain changes and modifications can be made without departing from the spirit and scope of the invention.

We claim:

1. A delivery device for the controlled and continuous release of a beneficial agent, the device comprising in combination,
   a. bioerodible container providing an internal space therein,
   b. a delivery device housed in the container, the device comprising,
   c. a beneficial agent,
   d. a reservoir containing the beneficial agent, said reservoir formed of a solid polymeric release rate controlling biologically acceptable imperforate material permeable to the passage of the agent by diffusion, the reservoir joined to,
   d. a hollow deformable closed member, said member comprising a means for moving from a collapsed position to an expanded position on release of the device from the container and moving from an expanded position to a collapsed position after a period of agent release time, with agent metered from the reservoir in a therapeutically effective amount by diffusion for a prolonged period of time on release of the device from the container in the environment of use while the means is in an expanded position and thereafter the means moving to a collapsed position.

2. A delivery device for the controlled and continuous release of agent according to claim 1 wherein the hollow deformable member is provided with a bioerodible plug that on bioerosion in a physiologic environment vents the interior of the member to its exterior.

3. A delivery device for the controlled and continuous release of agent according to claim 1 wherein the hollow deformable member is formed of an elastic material permeable to a gas that slowly diffuses through the material to move the member from an expanded position to a collapsed position.

4. A delivery device for the controlled and continuous release of agent according to claim 1 wherein the hollow deformable member contains a liquid means for producing a gas that has a vapor pressure above one atmosphere at ambient temperature.

5. A delivery device for the controlled and continuous release of an agent according to claim 1 wherein the reservoir contains an agent that produces a local effect.

6. A delivery device for the controlled and continuous administration of an agent according to claim 1 wherein the hollow deformable member is formed of a material that bioerodes at a physiological temperature in a physiological environment.

7. A delivery device for the controlled and continuous release of a beneficial agent, the device comprising in combination,
   a. a beneficial agent,
   b. a reservoir containing the beneficial agent, said reservoir formed of a solid polymeric release rate controlling biologically acceptable imperforate material permeable to the passage of the agent by diffusion, the reservoir joined to,
   c. a hollow deformable closed member, said member for moving from a collapsed position to an expanded position in a preselected environment of use and for moving after release of agent from the device to a collapsed position for transit of device from the environment, with agent metered from the reservoir in a therapeutically effective amount for a prolonged period of time in the environment of use when the means is in the expanded position thereafter the means moving to a collapsed position.

8. A delivery device for the controlled and continuous release of a beneficial agent, the device comprising in combination,
   a. a bioerodible container providing an internal space therein,
   b. a delivery device housed in the container, the device comprising,
   c. a beneficial agent,
   d. a reservoir containing the beneficial agent, said reservoir formed of a polymeric microporous material containing the beneficial agent, whose micropores are a means for containing an agent release rate controlling medium permeable to the passage of the agent by diffusion, the reservoir joined to,
   e. a hollow deformable closed member, said member comprising a means for moving from a collapsed position to an expanded position on release of the device from the container and movable fron an expanded position to a collapsed position after a period of agent release time, with agent metered from the reservoir in a therapeutically effective amount by diffusion through the release rate controlling medium for a prolonged period of time on release of the device from the container in the environment of use while the means is in an expanded position and thereafter the means moving to a collapsed position.

9. A delivery device for the controlled and continuous release of agent according to claim 1 wherein the hollow deformable member contains a liquid means for producing a gas that has a vapor pressure above one atmosphere at physiological temperature.

10. A delivery device for the controlled and continuous release of an agent according to claim 1 wherein the reservoir contains an agent that produces a systemic effect.

11. A delivery device for the controlled and continuous release of a beneficial agent, the device comprising in combination,
    a. a beneficial agent,
    b. a reservoir containing the beneficial agent, said reservoir formed of a polymeric microporous solid material containing the beneficial agent, whose micropores are a means for containing a liquid release rate controlling medium permeable to the passage of the agent by diffusion, the reservoir joined to,
    c. a hollow deformable closed member, said member comprising a means for moving from a collapsed position to an expanded position in a preselected environment of use and for moving after release of agent from the device to a collapsed position for transit of device from the environment,
    d. and wherein agent is metered from the reservoir in a therapeutically effective amount by diffusion through the release rate controlling material for a prolonged period of time in the environment of use when the member is in the expanded position and thereafter the member moving to a collapsed position.

* * * * *